United States Patent [19]
Watanabe

[11] Patent Number: 5,450,057
[45] Date of Patent: Sep. 12, 1995

[54] STEREOPHONIC WARNING APPARATUS

[75] Inventor: Hiroshi Watanabe, Kanagawa, Japan

[73] Assignee: Nissan Motor Co., Ltd., Yokohama, Japan

[21] Appl. No.: 968,947

[22] Filed: Oct. 30, 1992

[30] Foreign Application Priority Data

Oct. 30, 1991 [JP] Japan ................................ 3-311730

[51] Int. Cl.$^6$ .............................................. B60Q 1/00
[52] U.S. Cl. .................................. 340/435; 340/436; 340/903; 340/460; 381/24; 381/86; 367/909; 364/461; 180/170; 180/169
[58] Field of Search ............... 340/435, 436, 942, 943, 340/903, 904, 961, 460; 381/24, 86; 367/909; 180/169, 170; 364/461

[56] References Cited

U.S. PATENT DOCUMENTS

| | | | |
|---|---|---|---|
| 4,058,796 | 11/1977 | Oishi et al. | 340/903 |
| 4,445,228 | 4/1984 | Bruno | 381/86 |
| 4,751,658 | 6/1988 | Kadouoff et al. | 364/513 |
| 4,912,767 | 3/1990 | Chang | 381/47 |
| 4,926,171 | 5/1990 | Kelley | 340/961 |
| 5,046,101 | 9/1991 | Lovejoy | 381/57 |
| 5,173,881 | 12/1992 | Sindle | 340/903 |
| 5,208,786 | 5/1993 | Weinstein et al. | 367/124 |
| 5,230,400 | 7/1993 | Kakinami et al. | 340/904 |

FOREIGN PATENT DOCUMENTS 56-135351 10/1981 Japan.
56-155876 12/1981 Japan.
63-16392 2/1988 Japan.

OTHER PUBLICATIONS

"Japan Acoustic Society Transaction", vol. 44, No. 12, pp. 936-942, 1988.

Primary Examiner—Brent Swarthout
Assistant Examiner—Nina Tong
Attorney, Agent, or Firm—Lowe, Price, LeBlanc & Becker

[57] ABSTRACT

A stereophonic warning apparatus for a vehicle is provided with a judging device which judges warning priority level relative to an object around the vehicle according to signals from radars for detecting the object and a vehicle behavior detecting device. A control device controls the output level of a plurality of speakers in a passenger compartment of the vehicle according to the position of the detected object such that the speakers output a warning sound to form a sound image at a position to which the detected object is located, while changing the warning sound according to the warning priority level.

19 Claims, 13 Drawing Sheets

STEREOPHONIC WARNING APPARATUS

BACKGROUND OF THE INVENTION

1. Field of the Invention

The present invention relates to improvements in a stereophonic warning apparatus which warns a driver of a vehicle by means of sound image formed according to the detected object around a vehicle.

2. Description of the Prior Art

Japanese Utility Model Provisional Publication No. 63-16392 discloses a warning system in which a plurality of sensors for detecting an object rearward of a vehicle are disposed at rear positions of the vehicle, respectively. The warning system warns a driver in a manner to indicate the direction of the detected object by changing the output level of right and left rear speakers according to the position of the object detected by the sensors.

However, such a conventional system is arranged to detect one object and is not arranged to distinguish a plurality of objects and generates warnings relative to them, respectively. Accordingly, in case that the vehicle with such a system is backwardly moved while changing the advancing direction, if a plurality of objects are detected, the driver of the vehicle may encounter a situation such that one of the objects leaves from the vehicle and another approaches the vehicle to increase the degree of danger. However, this conventional system merely warns the driver with a constant warning sound in this situation and therefore the driver cannot judge which warning is most important or emergent.

SUMMARY OF THE INVENTION

It is an object of the present invention to provide an improved stereophonic warning apparatus which is arranged such that a driver of the vehicle with this apparatus can easily distinguish the degree of importance of each of plural objects and rapidly recognize the waning sound with high accuracy according to the motion of the vehicle.

A stereophonic warning apparatus according to the present invention comprises object detecting means which detects an object around a vehicle and outputs signal indicative of position of the detected object. Vehicle behavior detecting means detects a vehicle behavioral condition. Judging means judges a warning priority level of the detected object according to the signals from the object detecting means and the vehicle behavior detecting means. A plurality of speakers are disposed in the vehicle. Controlling means controls an output level of each of the speakers according to the signal from the object detecting means to generate sound image by means of warning sound. The controlling means varies the warning sound according to the warning priority level.

With this arrangement, even if a plurality of objects are detected, a driver of the vehicle can distinguish the degree of danger or emergency of each object since the warning sound to each object is determined according to the warning priority level to each object.

BRIEF DESCRIPTION OF THE DRAWINGS

In the drawings, like reference numerals designate like parts and elements throughout all figures, in which.

DETAILED DESCRIPTION OF THE INVENTION

Figure 1:
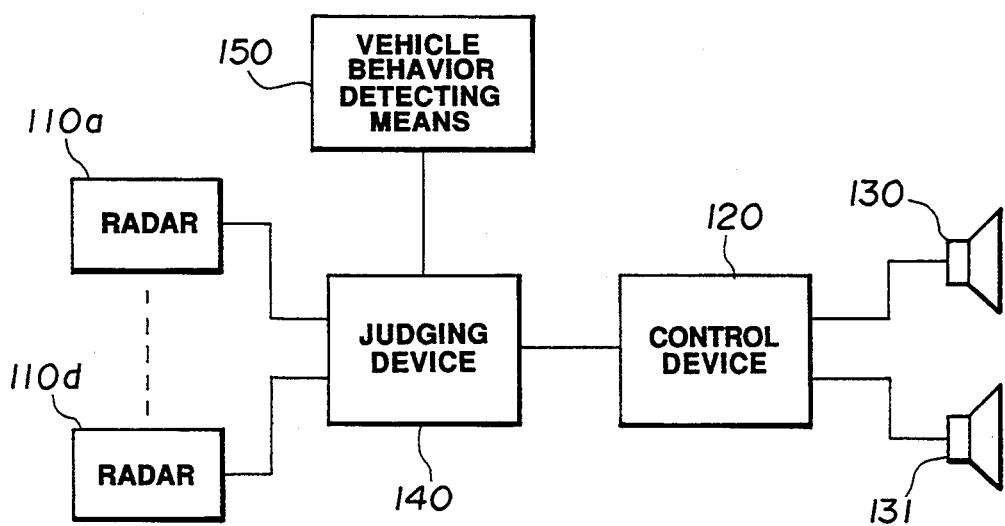
FIG. 1 is a block diagram showing a first embodiment of a stereophonic warning apparatus according to the present invention.
Figure 2:
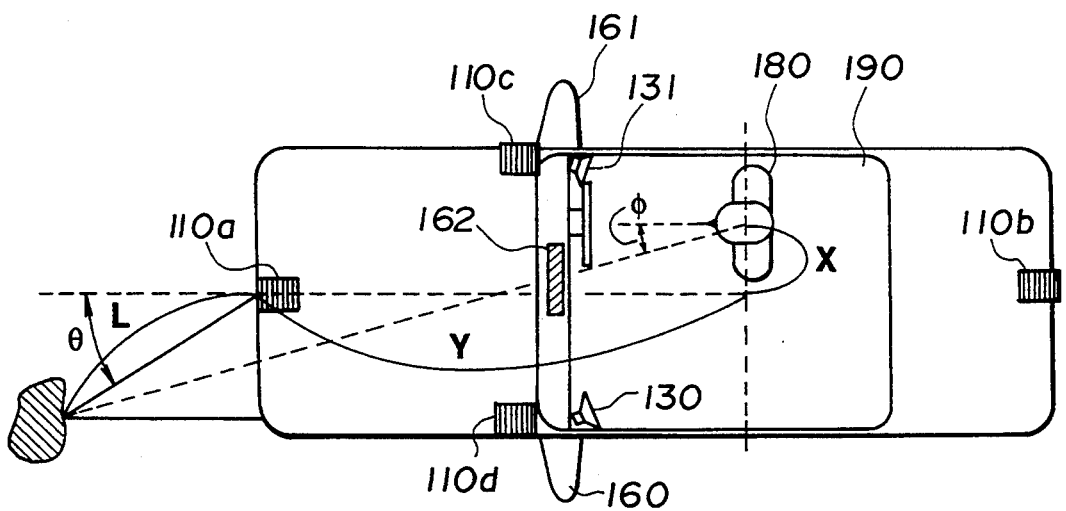
FIG. 2 is a schematic top view of the first embodiment of FIG. 1.

Referring now to FIGS. 1 to 2, there is shown a first embodiment of a stereophonic warning apparatus according to the present invention.

The stereophonic warning apparatus is for a vehicle and comprises radars 110$a$, 110$b$, 110$c$ and 110$d$ acting as means for detecting objects around the vehicle. The first radar 110$a$ is disposed at a front portion of the vehicle, the second radar 110$b$ is disposed at a rear portion of the vehicle, and the third and fourth radars 110$c$ and 110$d$ are disposed at side portions, respectively, as shown in FIG. 2. A judging device 140 is connected to the radars 110$a$, 110$b$, 110$c$ and 110$d$ and a vehicle behavior detecting means 150 so as to receive signals from the radars 110$a$ to 110$d$ and the vehicle behavior detecting means 150. The judging device 140 judges warning priority level of the detected object according to the received signals. A control device 120 drives speakers 130 and 131 disposed at right and left end portions of a meter panel and near right and left door mirrors 160 and 161 according to the signal from the judging means 140. A room mirror 162 is installed in a passenger room of the vehicle for viewing a backward of the vehicle. The control device 120 includes a memory in which data for determining the position for locating the sound image are stored. The control device 120 controls the sound image according to the signals indicative of the position of the object and the warning priority level from the judging means 140. The judging device 140 and the control device 120 are practically constituted by a micro-computer.

Figure 3:
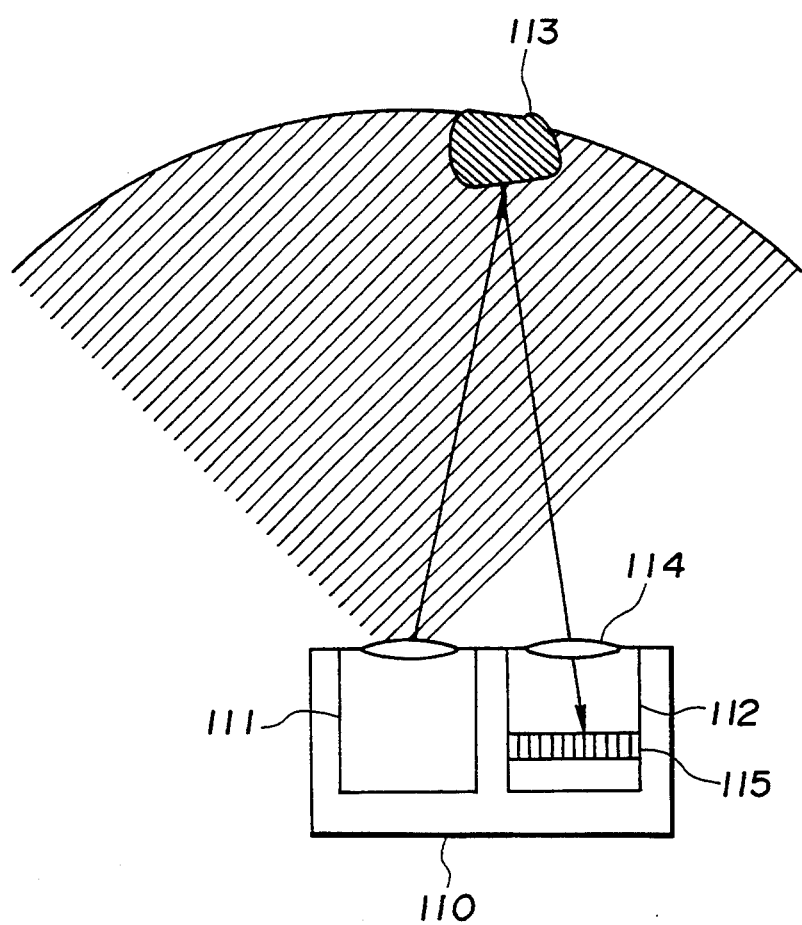
FIG. 3 is a view showing a structure of a radar applied to the first embodiment.

As shown in FIG. 3, each of the radars 110$a$ to 110$d$ is provided with a pulsed laser beam emitter 111 and a pulsed laser beam detector 112. The emitter 111 is arranged to illuminate a broad area with pulsed laser beam. The receiver 112 is provided with a lens system 114 and arrayed photo-detecting elements 115. When some objects exist in the area illuminated by the laser beam from the emitter 111, the laser beam is reflected by the object and detected by the receiver 112.

The distance between the detected object and the radar 110a (110b, 110c, 110d) is obtained by counting a time period T from a moment of the start of the illumination of the pulsed laser beam from the emitter 111 to a moment of the receiving of the pulsed laser beam by the receiver 112. That is, the distance L (m) to the object 113 is derived from the following equation:

$$L = T \cdot C / 2$$

wherein $C = 3 \times 10^8$ m/sec.

The angle $\theta$ and the distance L relative to the object 113 are obtained in a manner that the reflected laser beam from the object 113 is received in one of the arrayed photo-detecting elements 115 according to the position of the object. In the event that the reflected beam is not detected even when $T_1$ seconds has past after a moment of the illumination of the pulsed laser beam, it is judged that no object exists around the vehicle. The time period T1 is determined corresponding the braking distance. For example, when the vehicle is run at a speed V km/h which is 40 Km/h and over, the braking distance R is determined as V m. When the vehicle speed is lower than 40 km/h, the braking distance R is uniformly determined as 40 meters. Accordingly, the time period $T_1$ is derived by the following equation:

$$T_1 = 2 \cdot R / C$$

When the object is detected, the detection is carried out at least twice, and the relative speed between the vehicle and the object 113 is simultaneously obtained from the change between the detected distances. When the object is only once detected, such a detection is treated as an incorrect detection, and the data of this detection is deleted. Each of the radars 110a to 110d is arranged to detect objects in a predetermined area, and with all of them, the all area around the vehicle is put into the detected condition.

The manner of operation of the thus arranged apparatus will be discussed hereinafter with reference to FIGS. 4 and 5.

Figure 4:
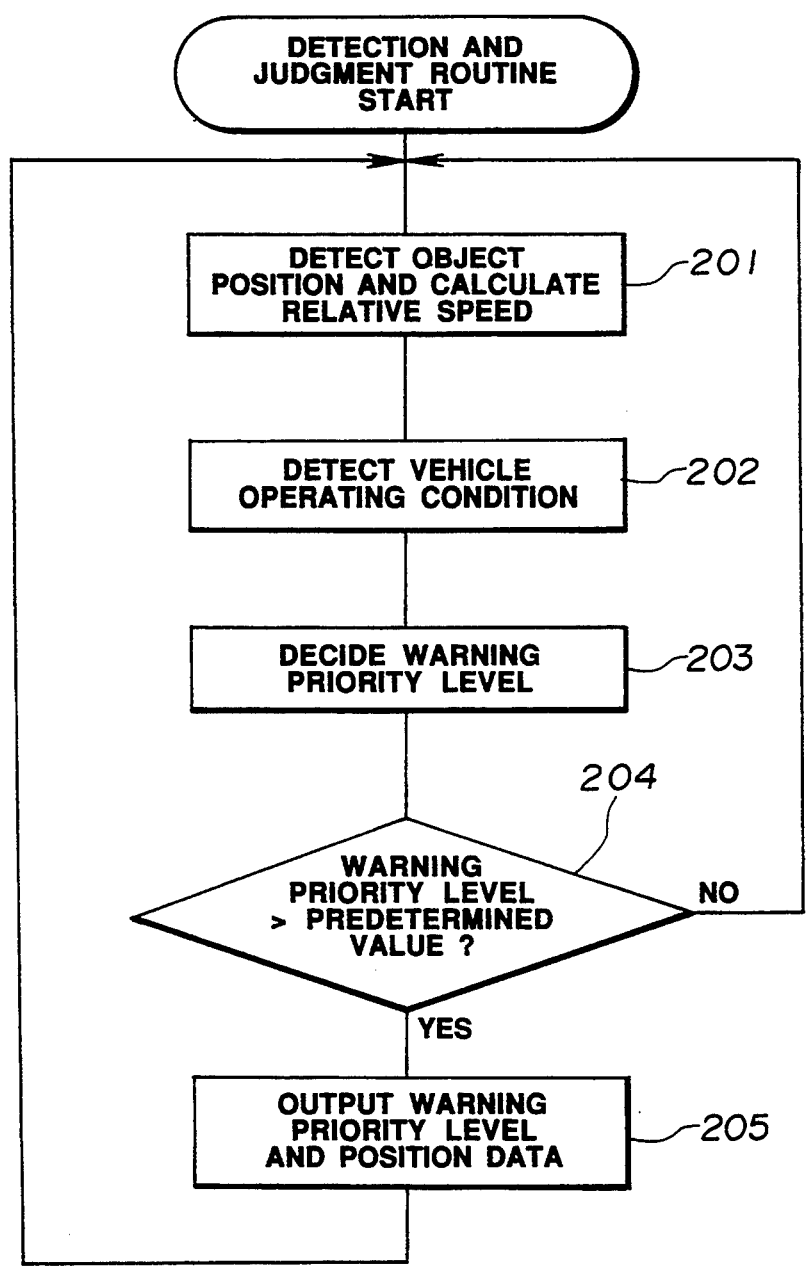
FIG. 4 is a flow chart showing a judging routine.
Figure 5:
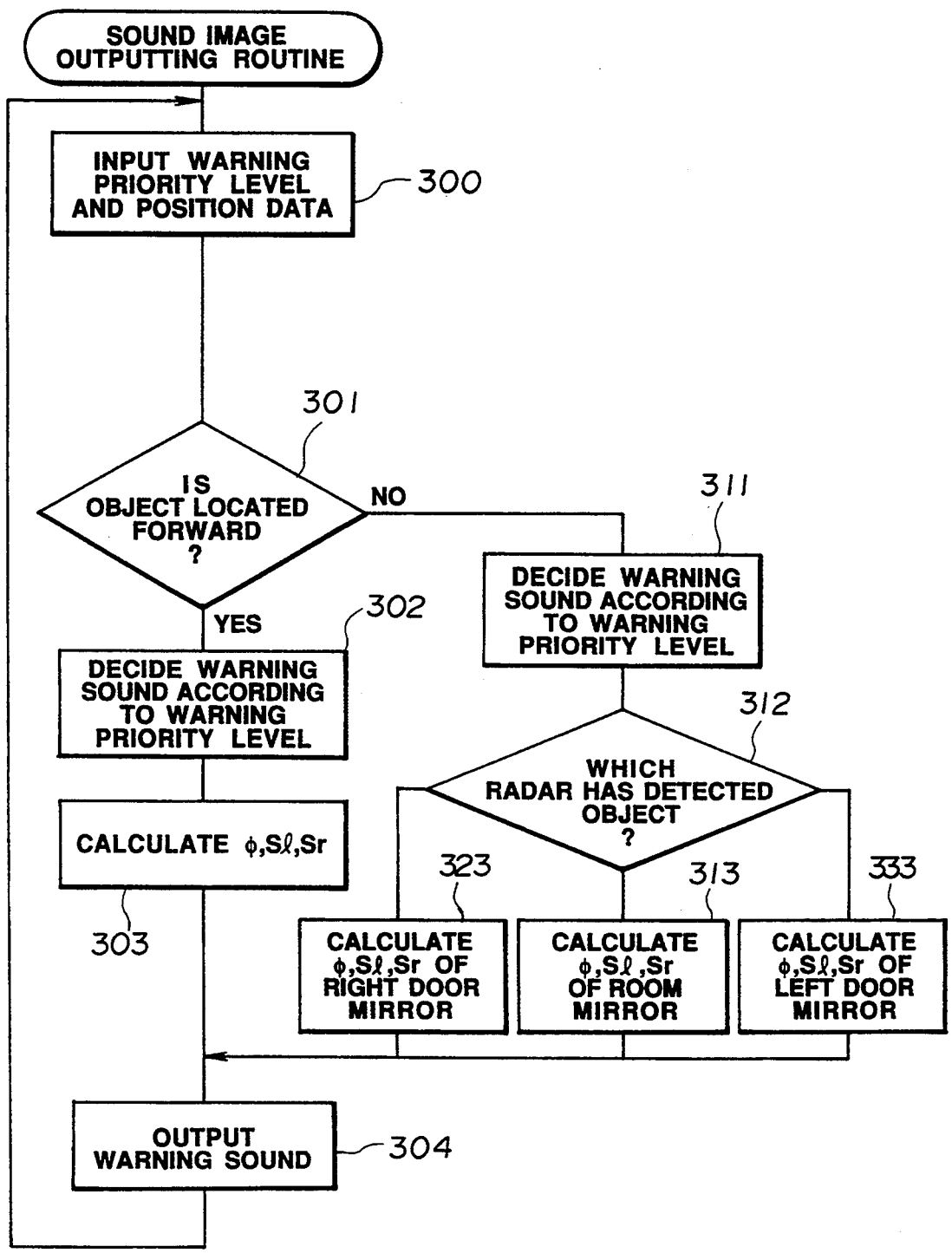
FIG. 5 is a flow chart showing a sound image output routine.

FIG. 4 is a flow chart which shows a routine of a detection of the object and a judgment of the warning priority level which is carried out by the judging device 140. The program routine starts its processing with the same time as the start of the engine of the vehicle since a main switch of this apparatus is turned on with the start of the engine.

In a step 201, the operation of the radars 110a to 110d is started, and when an object is detected, a distance L, an angle $\theta$, a relative speed Vc between the object and the vehicle, and which radar detected the object, are determined. Although in this embodiment, the second detected distance L2 and the angle $\theta$2 are used as the distance L and the angle $\theta$, it will be understood that an alternate structure may use the first detected data L1 and $\theta$1 as the distance L and the angle $\theta$, and the second detection may be utilized for the recognition if the first detection is incorrect.

In a step 202, signals from various meters and switches acting as a vehicle condition detecting means 150 are inputted into the judging device 140. Furthermore, the positions of winker levers, vehicle speed, the operating condition of the brakes and the steering angle of a steering of the vehicle, and the angular velocity of the steering, are detected.

Figure 6:
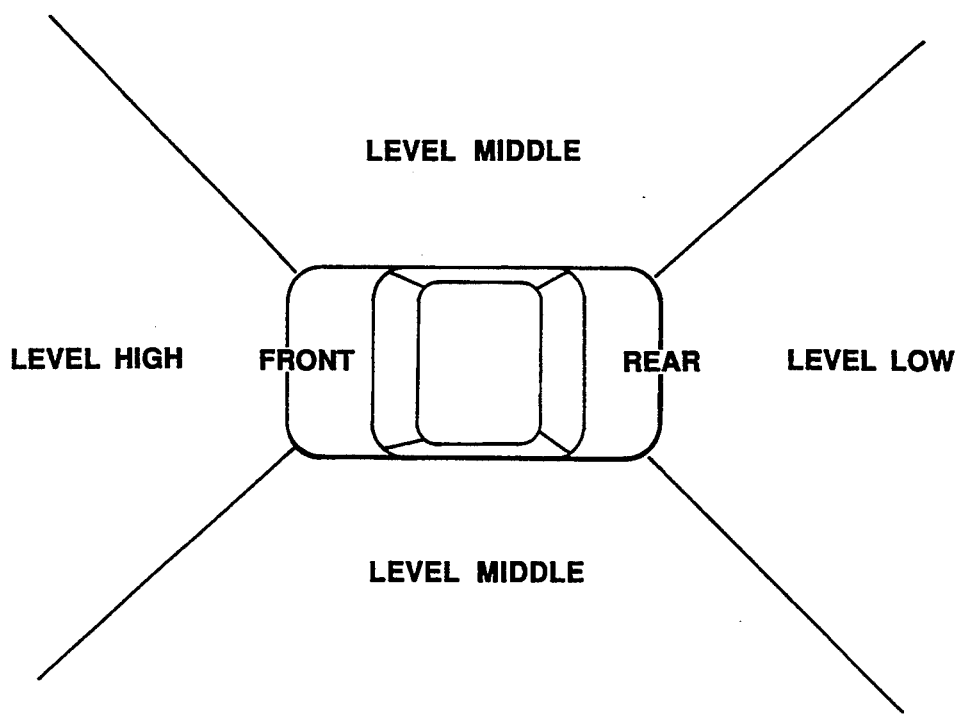
FIGS. 6, 7, 8 and 9 are views showing examples of the warning priority level under various vehicle operating conditions, respectively.

Following this, in a step 203, it is judged whether warning operation is carried out or not, and the warning priority level is determined. The decision of the warning priority level is carried out according to the distance, the angle, the relative speed and the vehicle operating condition. That is to say, if the distance L is short, the warning priority level becomes high. If the distance L is long, the warning priority level becomes low. Similarly, in connection with the relative speed, if the relative speed Vc is positive, that is, if the object goes near to the vehicle, the warning priority level becomes high. If the object becomes more distant from the vehicle, the warning priority level becomes low. Further, in connection with the vehicle operating condition, when the vehicle is driven at a previously determined speed and over, the warning priority level relative to the object detected at the forward side of the vehicle becomes high, the warning priority level at the backward side of the vehicle becomes low and the warning priority level at each lateral side becomes intermediate, as shown at FIG. 6.

Figure 7:
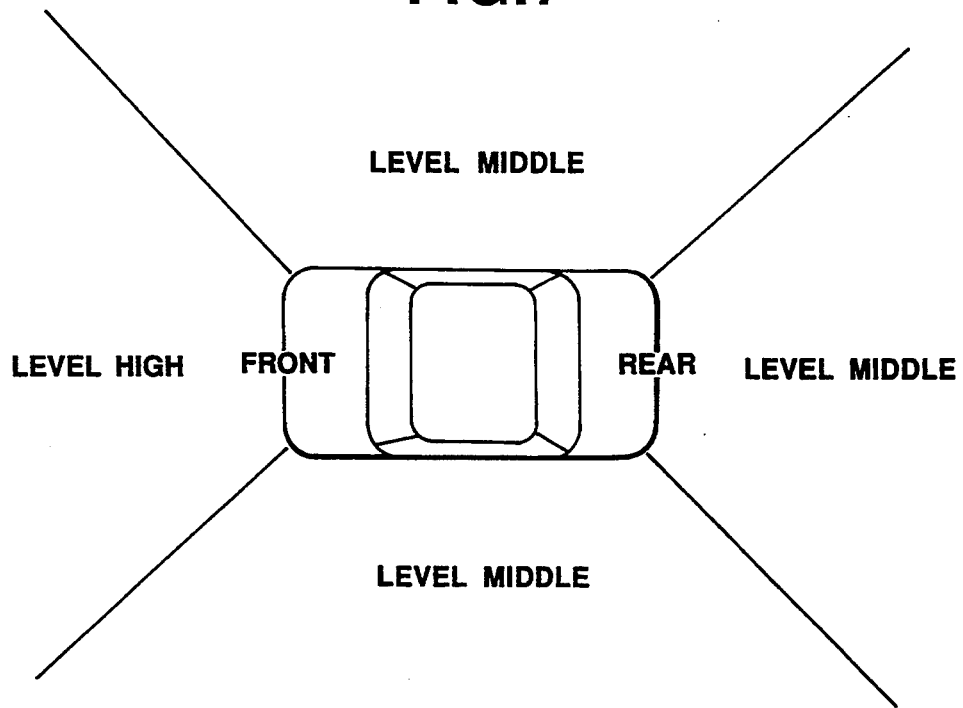

When the vehicle is driven at a low speed, the warning priority level relative to a rearward object is raised to middle as shown in FIG. 7, due to the consideration of a rearward collision accident.

Figure 8:
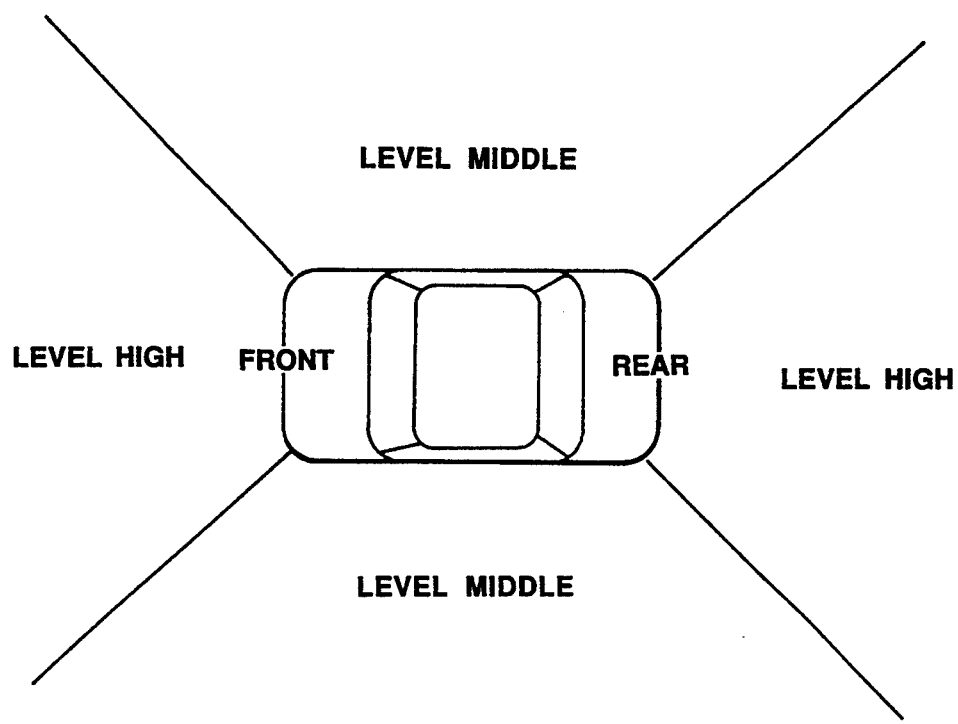

FIG. 8 shows a condition of the warning priority level during a braking, wherein the warning priority level relative to a rearward object is set at high.

Figure 9:
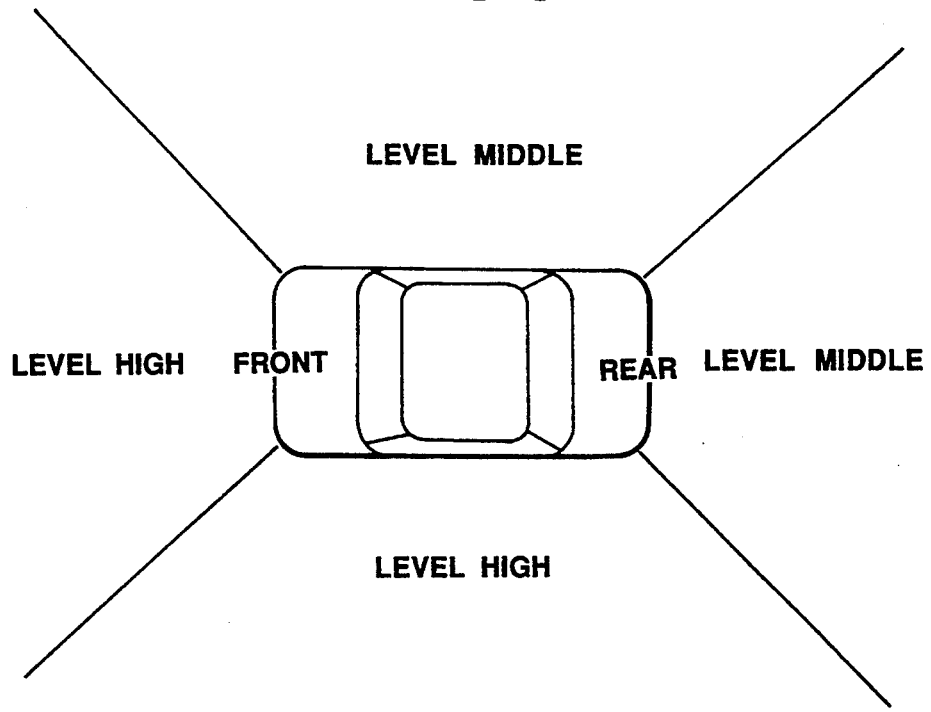

In the event that a winker lever or steering is operated, since it is supposed that the change of a traffic lane or turning of the vehicle is carried out, the warning priority level relative to the advancing direction of the vehicle becomes high. For example, when the vehicle is turned to left, the warning priority level relative to the left hand side object is raised and set at high, as shown in FIG. 9.

In the step 203, on the basis of the above-mentioned warning priority level, a total warning priority level relative to the detected object as follows:

Warning priority level = (a warning priority level due to the relative speed between object and vehicle) + (a warning priority level relative to a distance L to the object) + (a warning priority level relative to the vehicle behavioral condition)

In a step 204, when the total warning priority level relative to an object is larger than a standard level which has been previously set, it is judged that the object is an obstacle and the program proceeds to a step 205. When the total warning priority level relative to an object is not larger than the standard level, the program returns to the step 201 without warning.

In the step 205, the warning priority level relative to the object which should be warned, and the position data L, $\theta$ and n are outputted to a sound image outputting routine which is explained after. Following this, the program is returned to the step 201.

Referring to a flow chart in FIG. 5, the sound image output routine carried out by the control device 120 will be discussed hereinafter.

In a step 300, the warning priority level and the position data is received. Following this, in a step 301, it is judged whether or not the object judged as an obstacle is located forward of the vehicle according to the position n of the radar which detected the object.

In case that the obstacle is located forward of the vehicle, the program proceeds to a step 302 wherein a warning sound is determined according to the warning priority level. For example, the warning sound is changed in its frequency elements and volume according to the warning priority level. That is to say, a warning sound is determined so as to include a large amount of frequency component near 2 k Hz so as to be made by a synthetic sound which is lowered by an octave in proportion to the lowering of the warning priority level. Simultaneously, the volume of the warning sound is lowered in proportion to the lowering of the warning priority level.

With these differences of the frequency component and volume, even when a plurality of warning sounds are outputted, the plurality of objects are distinguished. Accordingly, a driver of the vehicle can easily judge the degree of danger amount of warned obstacles.

In a step 303, the angle $\Phi$ of the position of the obstacle in the coordinates axis wherein a driver 180 is located at origin point is calculated. With reference to FIG. 2, the distance on the coordinates axis is taken in that the forward and leftward are plus. The angle $\Phi$ is defined such that the head-on of the driver is 0 degree, and left hand side from the head-on is defined as plus degree. When the coordinate of the set position of the radar 110a is (X, Y), the angle $\Phi$ is represented by the following equation:

$$\Phi = \tan^{-1}\{(x+L\cdot\sin\theta)/(y+L\cdot\cos\theta)\}$$

The output level and phase S1 and Sr are determined such that the sound image is formed at a position located at the angle $\Phi$ and coordinate point $\{(x+L\cdot\sin\theta), (y+L\cdot\cos\theta)\}$ in the defined coordinates, by left and right speaker 130 and 131. That is to say, the output from the speakers 130 and 131 are calculated and determined such that the driver feels that the sound source is located at a position of the obstacle.

In a step 304, the left and right speakers 130 and 131 are driven by the determined output level and phase S1 and Sr.

When the judgment in the step 301 is "NO", that is, when no obstacle exists in the forward of the vehicle, the program proceeds to a step 311 wherein the warning sound according to the warning priority level is determined as the same in the step 302. Then, the program proceeds to a step 312 wherein it is judged which radar has detected the obstacle. If the radar 110b detects the obstacle, the program proceeds to a step 313 wherein the angle $\Phi$ is determined to define the sound image at the position of the back mirror 162, and the output level and the phase S1 and Sr are calculated.

In the step 312, when it is judged that the radar 110c or 110d has detected the obstacle, the program proceeds to a step 323 or step 333. In the step 323, the angle is determined such that the sound image is positioned at the right door mirror and the output level and phase for each of the speakers 130 and 131 are determined corresponding the sound image. In the step 323, the angle $\Phi$ is determined such that the sound image is positioned at the right door mirror 161, and the output level and phase for each speaker 130, 131 are determined corresponding the image sound.

After the processing in the step 313, step 323 or step 333, the program proceeds to the step 304 wherein the warning sound is outputted. Following this, the program is returned to the step 300 in order to wait for the input of the data.

With the thus arranged structure, even when the plurality of objects are detected, the driver is informed that the degree of the danger of the objects in a manner that the warning sound is changed according to the warning priority level which is determined according to the distance and the relative speed between the vehicle and the object, and the operating condition of the vehicle.

Further, even when the driver pays attention to the object at a backward of the vehicle, the driver can rapidly pay attention to the object without seeing rearward by turning his head since the position of the back mirror at which the driver can recognize the object is determined by the sound image.

Furthermore, if the apparatus according to the present invention is arranged such that the sound image is positioned at the door mirror which is located at a side where the winker is operated, the recognition of the left or right backwards will be recommended to the driver during the left or right turn.

It will be understood that the radars 110a to 110d may be arranged such that the angle of the radiated beam is set at small and the radiated portion is driven by a motor or the like to change the angle of the radiated beam in turn. In this case, if the object is detected, at least twice the detecting operation is carried out and then, the angle of the radiated beam is changed.

Furthermore, it will be noted that a rotatable mirror may be located at the front portion of the beam radiating portion so as to reflect the radiated beam through the rotatable mirror, that a plurality of radiating portions which are directed in different directions are disposed to radiate from each of the radiating portions in turn and to be rotatingly moved, and that the radars may not be the same and may be a sensor for detecting ultrasonic wave or electromagnetic wave according to the measuring area.

It will be also understood that the warning sound may be a voice, and in order to inform the difference of the degrees of the importance among the plural objects, the warning sounds may be ordered in the order from high to low in the warning level or amplitude modulation may be applied to the warning sounds such that the warning sound for the high warning priority level is in short period and the period of the amplitude modulation is becomes longer in proportion to the lowering of the warning priority level.

Figure 10:
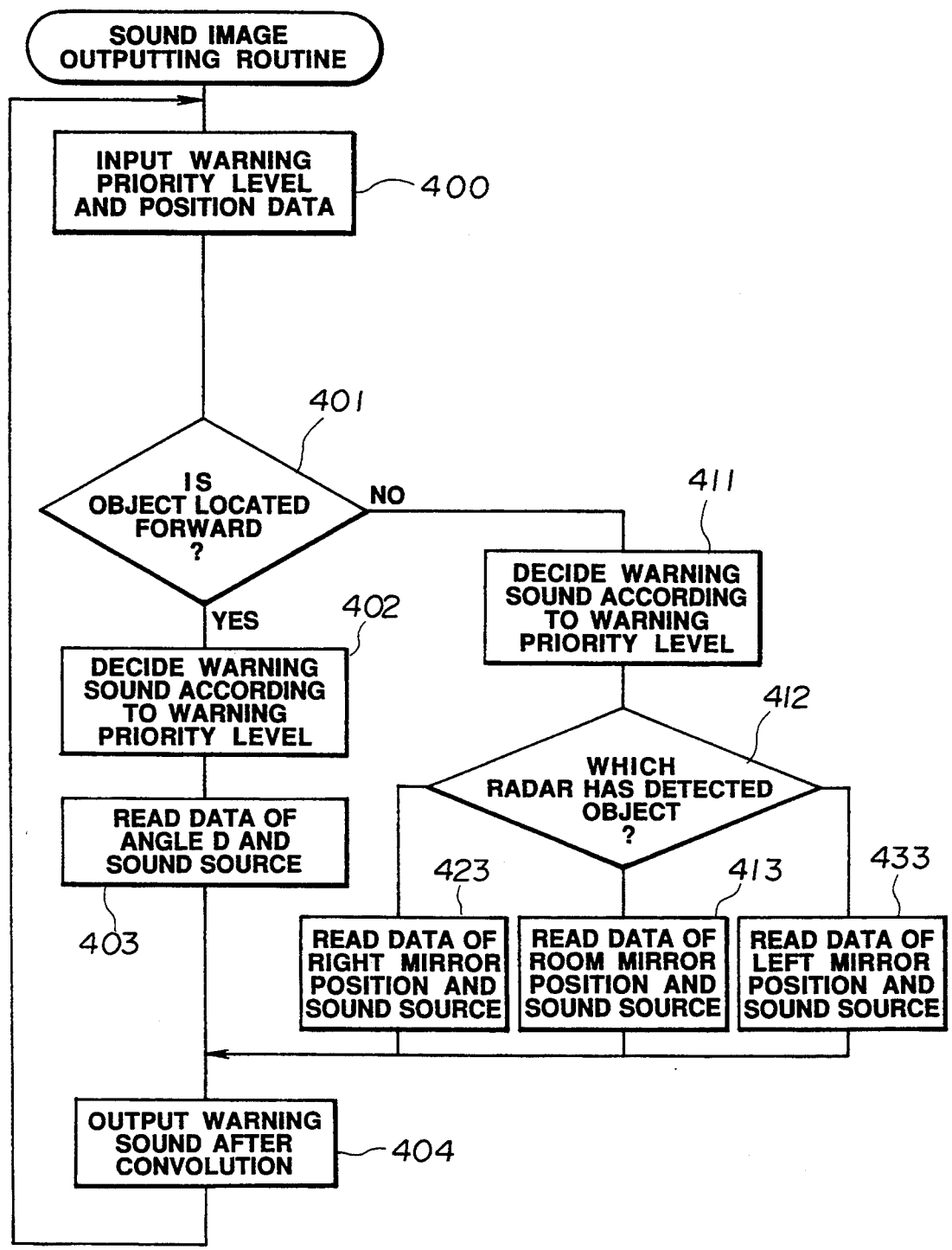
FIG. 10 is a flow chart of the, sound image output routine of the second embodiment.

Referring to FIG. 10, there is shown a second embodiment of the stereophonic warning apparatus according to the present invention.

In the second embodiment, the control device 120 employs an art disclosed in "Vol., 44, No. 12, Pages 936–942 of Japan Acoustic Society Transaction" published in 1988 wherein a plurality of sound source positions which are previously simulated in their transmitting characteristics to both ears of the driver 180 are memorized in the control device 120. That is to say, a memory of the control device 120 previously memorizes data indicative of the position of the sound source located at the door mirrors 160 and 161 and the room mirror 162, such as an angle d, impulse responses IMdl and IMdr between the sound source and both ears of the driver. Furthermore, impulse responses of filters Cll, Clr, Crl and Crr for correcting asymmetry of the speakers and for removing crosstalk component, and data of the warning sound according to the warning priority level are previously memorized in the memory.

In a step 400, the control device 120 receives position data L, $\theta$ and n, and the warning priority level relative to the object outputted from the judging device. In a step 401, it is judged whether the obstacle is located at the forward of the vehicle or not. When the judgment in the step 401 is "YES", in a step 402 the warning sound is determined according to the warning priority level. These steps 401 and 402 are in correspondent with the steps 301 and 302 in FIG. 5.

In a step 403, the angle $\Phi$ of the obstacle position relative to the driver 180 is calculated, and impulse responses IMdl and IMdr indicative of the angle d which is the most similar to the angle of the object position are selected from the memory. Further, data N of the warning sound is read on according to the previously decided warning priority level.

When the judgment in the step 401 is "NO", the program proceeds to a step 411 wherein the warning sound is determined according to the warning priority level. In a step 412, it is judged which of right and rearward, left and rearward or rearward is the object located. When the object is located at the right and rearward, the program proceeds to a step 423. When at left and rearward, the program proceeds to a step 433. When at rearward, the program proceeds to a step 413. In the respective steps 423, 433 and 413, impulse response IMdl, IMdr of the respective positions of the right door mirror 161, the left door mirror 160 and the room mirror 162 are read on from the memory, and the warning sound different from that of the frontal object is read on.

Following this, the output level and phase S1 and Sr are calculated from impulse response Cll, Clr, Crl and Crr of a correction filter and the selected sound source impulse response IMdl and IMdr by the following equations:

$$S1 = IMdl * (Cll * N + Crl * N)$$

$$Sr = IMdr * (Clr * N + Crr * N)$$

wherein * indicates the convolution.

The warning sound is outputted from the speakers 130 and 131 on the basis of the obtained S1 and Sr. After the output of the warning sound, the program is returned to the step 400 wherein next data is waited for.

With this arrangement, it becomes possible that the driver feels to hear the warning sound which sounds as if the sound source is located at a position as same as the located position of the obstacle or at a mirror position according to the direction of the obstacle, by selecting the sound image from the previously prepared impulse response and by positioning it.

Figure 11:
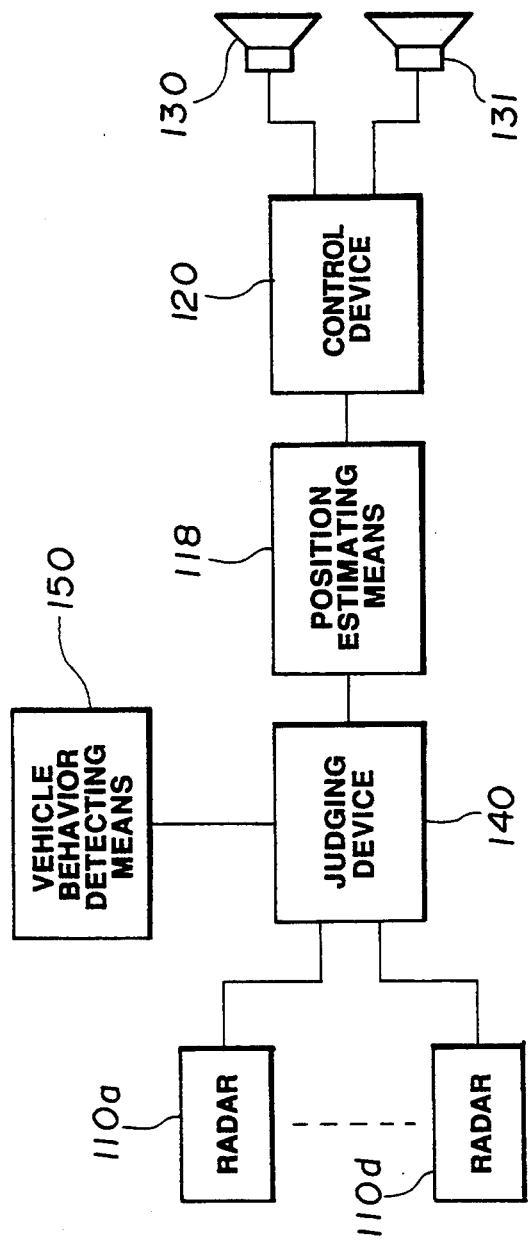
FIG. 11 is a block diagram showing a third embodiment of the stereophonic warning apparatus according to the present invention.

Referring to FIG. 11, there is shown a third embodiment of the stereophonic warning apparatus according to the present invention.

Figure 12:
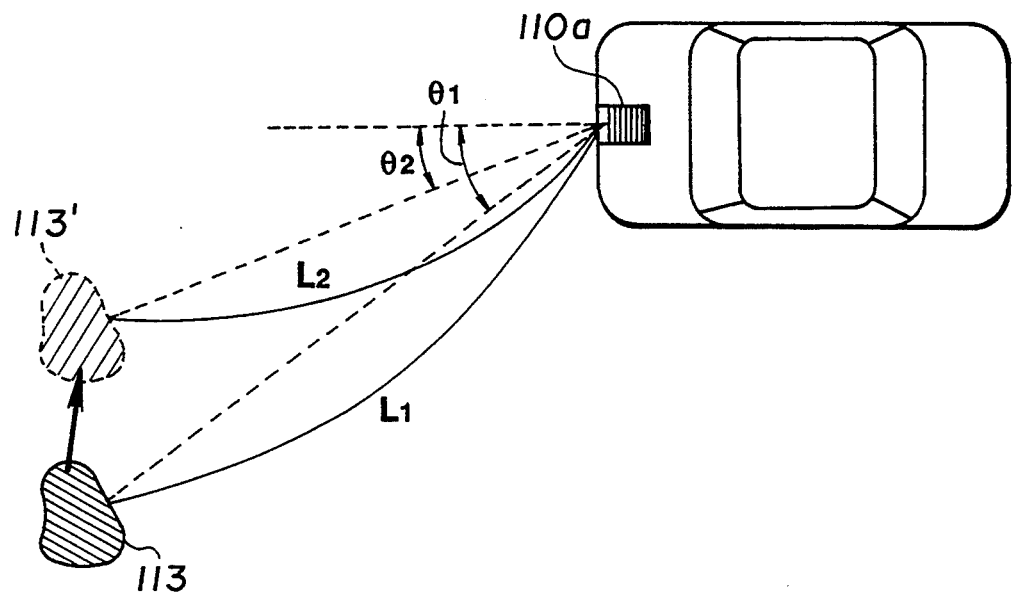
FIG. 12 is a view for explaining the estimation of obstacle position.

This embodiment is arranged such that the sound image is outputted with due regard to the relative speed between the vehicle and the obstacle, and the processing time in the system. A position estimating means 118 is located between the judging device 140 and the control device 120. An object detected by the radar 110a (110b, 110c, 110d) is measured twice as is similar in the first embodiment. As shown in FIG. 12, at a time S seconds after the detection of the angle $\theta$1 and the distance L1 of an object 113, if an object 113' is detected at the angle $\theta$2 and distance L2, the moving distance R of the object 113 is calculated as follows:

$$R = \{L1^2 + L2^2 - 2 \cdot L1 \cdot L2 \cdot \cos(1 - \theta 2)\}^{\frac{1}{2}}$$

Additionally, the lateral component of the relative speed Vc is represented as follows:

$$VH = (L1 \cdot \sin\theta 1 - L2 \cdot \sin\theta 2)/S$$

The vertical component of the relative speed Vc is represented as follows:

$$VV = (L1 \cdot \cos\theta 1 - L2 \cdot \cos\theta 2)/S$$

Although a processing time until the sound image is proposed from the detection of the object is determined due to the system, herein, when the processing time is taken as a constant Ts and a response time from the detection of the sound by the driver to the response upon feeling is Tm, the time from the detection of the object by the system to the recognition of the sound image by the driver becomes Ts+Tm. Accordingly, the position estimating means 118 estimates the position of the object which was located at a moment before Ts+Tm from the detection of the object, on the basis of the twice measured results from the radars 110a to 110d through the judging means 140. That is to say, the estimated position (L, $\theta$) of the object at a moment after Ts+Tm seconds is represented by the following equations:

$$L = [\{L2 \cdot \sin\theta 2 + VH \cdot (Ts+Tm)\}^2 + \{L2 \cdot \cos\theta 2 + Vv \cdot (Ts+Tm)\}^2]^{\frac{1}{2}}$$

$$\theta = \tan^{-1}[\{L2 \cdot \sin\theta 2 + VH \cdot (Ts+Tm)\}/\{L2 \cdot \cos\theta 2 + Vv \cdot (Ts+Tm)\}]$$

Figure 13:
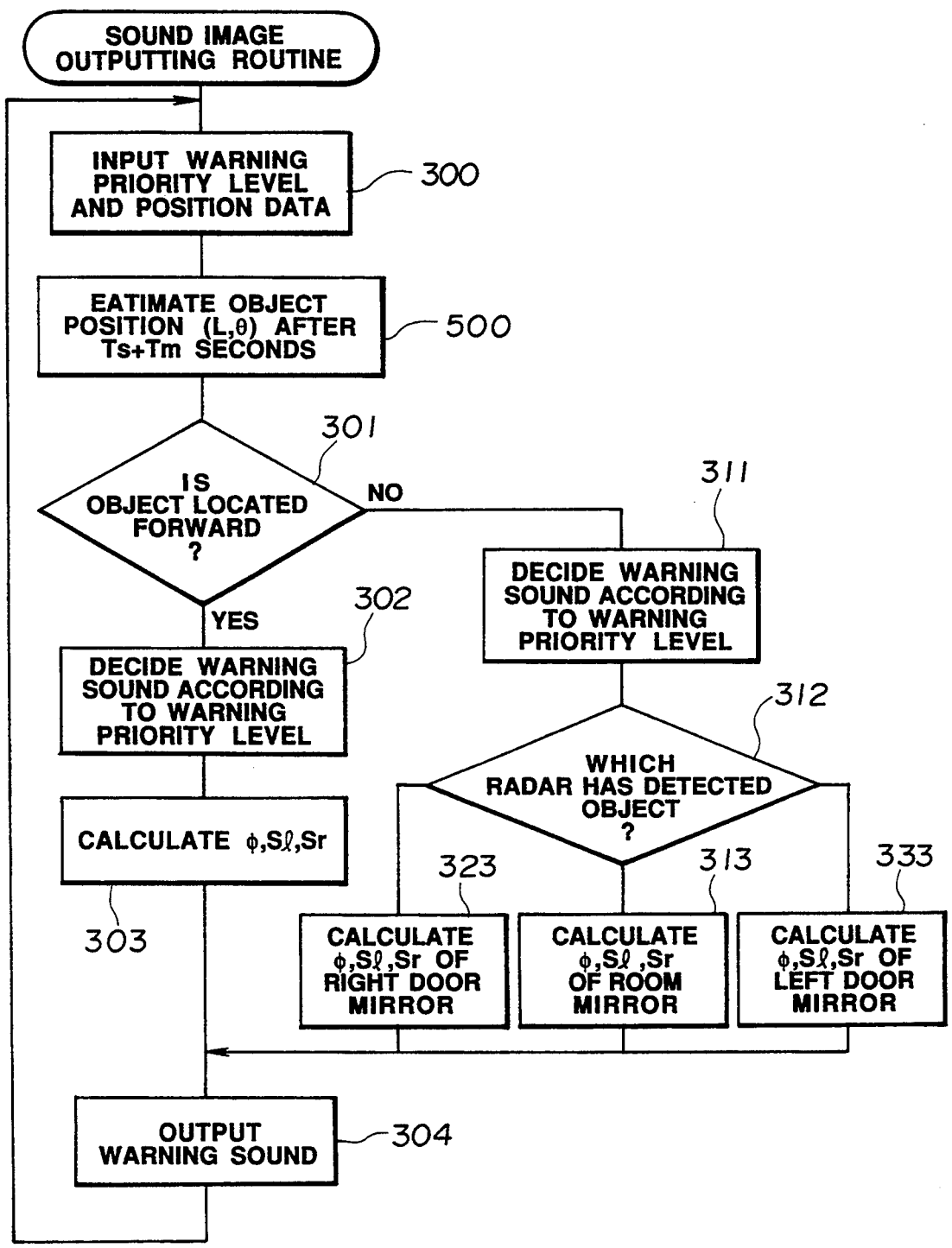
FIG. 13 is a flow chart showing an operation of the position estimation.

Referring to FIG. 13, there is shown a flow chart which shows a processing procedure in case that a micro-computer operates as the judging device 140, control means 120 and position estimating means 118.

In a step 300, the position estimating means 118 receives distance, angle, relative speed, warning priority level and the like which are of data of the object detected by the radars 110a to 110d by every detection.

In a step 500, the estimated position (L, $\theta$) of the object at a moment after Ts+Tn seconds according to the second detected data. Following to this, in a step 301, it is judged on the basis of whether or not the object is located at a forward of the vehicle.

Figure 14:
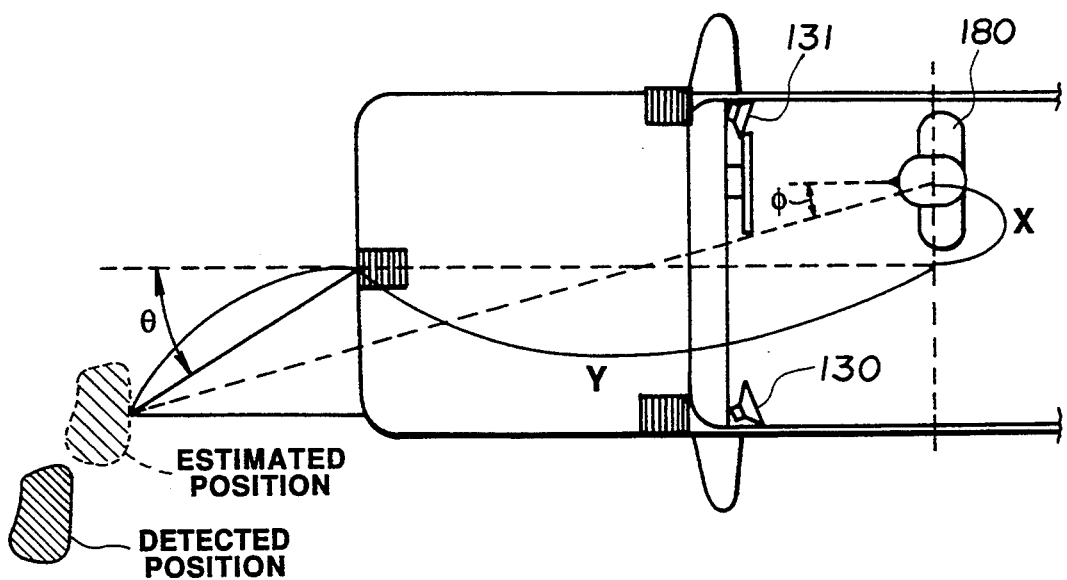
FIG. 14 is a view for explaining the position at which the sound image is formed.

The angle $\Phi$ and distance L of the estimated position (L, $\theta$) relative to the driver 180 are calculated, and the output level S1 and Sr are determined to define the sound image, as shown in FIG. 14.

With this arrangement, the sound image is formed at an estimated position where the object is moving on the basis of the relative speed between the vehicle and the object during a time period in the processing time and the response time relative to the sound. Accordingly, the position of the sound image at a moment the driver recognizes the sound image always corresponds to the position of the object. Therefore, the driver can recognize the object at the same time recognizing the sound image and therefore hears the proper warning sound.

Figure 15:
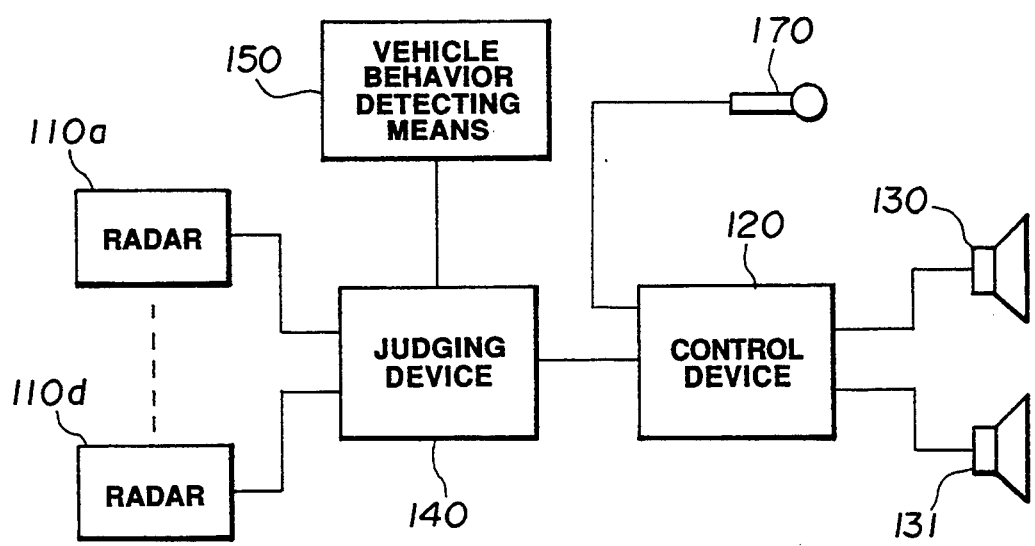
FIG. 15 is a block diagram showing a fourth embodiment according to the present invention.
Figure 16:
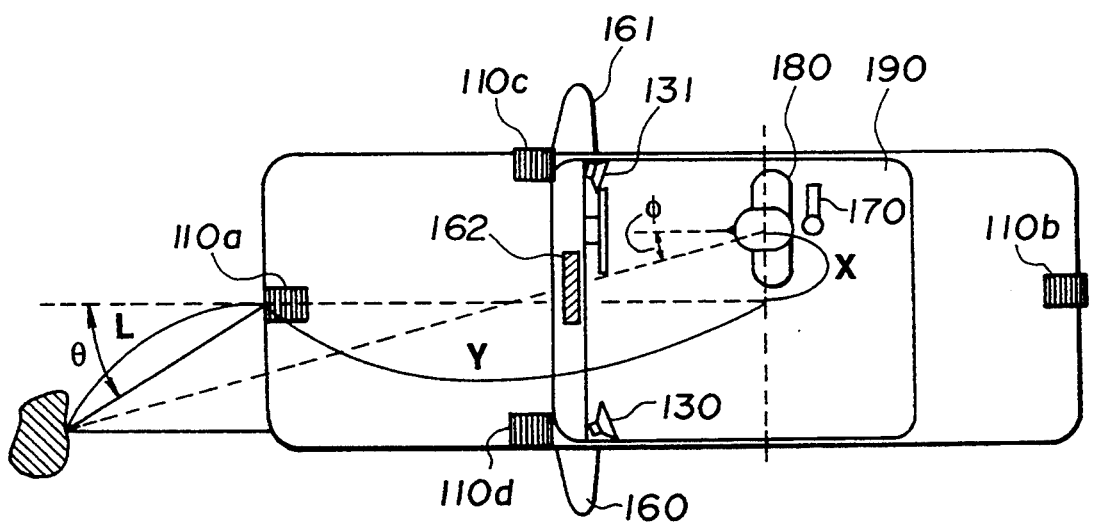
FIG. 16 is a schematic top view of the fourth embodiment of FIG. 15.

Referring to FIGS. 15 and 16, there is shown a fourth embodiment of the stereophonic warning apparatus according to the present invention.

The fourth embodiment is arranged such that the accuracy of the driver's recognition relative to the position of the sound image is improved with due regard to the noise level.

When the noise around the driver and in the vehicle compartment becomes loud, the sound which is outputted in small level from the speaker is largely influenced by the noise. Accordingly, the sound outputted from one speaker with the smaller output level is heard smaller by the driver. That is to say, the sound outputted in smaller level from the speaker is masked by the sound having a loudness of a noise level, and is heard to be smaller than the real output level. As a result, the difference between the sound pressure level between right and left is relatively increased, and therefore it will be afraid that the position of the sound image may be offset toward the speaker outputting the larger sound. Therefore, in this embodiment, the difference between the output levels of the speakers are corrected such that the driver recognizes the difference between the output level to be constant under various noise.

Figure 17:
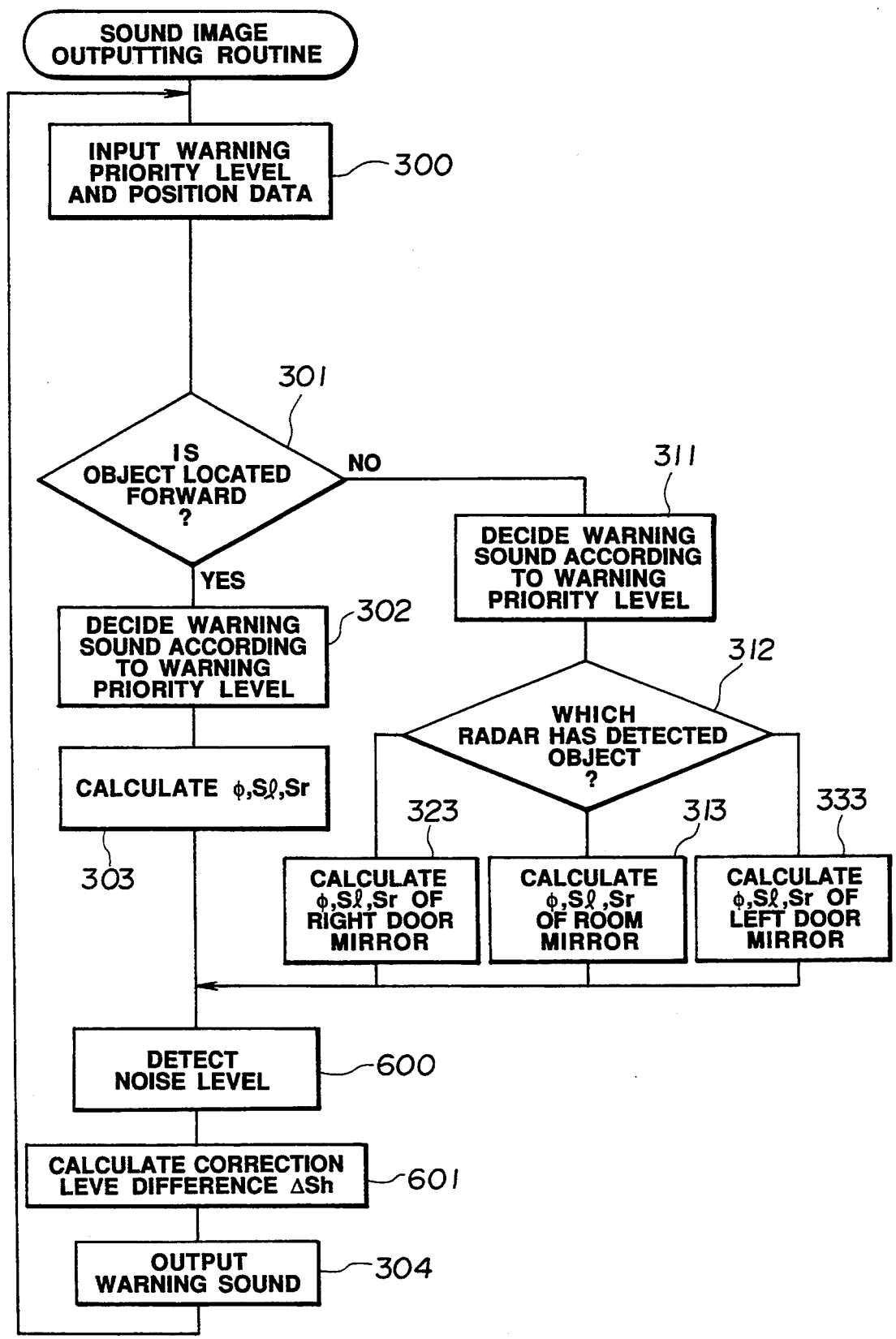
FIG. 17 is a flow chart showing a routine of sound image output.

The radars $110a$ to $110d$ are connected to the judging device 140 to which the signal from the vehicle condition detecting means 150 is inputted. Upon receiving the signals from the vehicle condition detecting means 150 and the radars $110a$ to $110d$, the judging device determines the warning priority level relative to the detected object. The control device 120 drives the speakers 130 and 131 according to the output of the judging device 140. Then, the control device 120 controls the sound image to be proposed on the basis of the position data and the warning priority level of the object from the judging device 140. Such these operations are similar to that shown in FIG. 1. In addition, a microphone 170 is disposed at a roof inner above the driver's head and connected to the control device 120. The control device 120 is arranged to correct the output level of the speakers 130 and 131 according to the noise level detected by the microphone 170. This correcting step is add in the routine for outputting the sound image in the fourth embodiment. The flow chart of the sound image outputting routine of the fourth embodiment is shown in FIG. 17.

In a step 303, 313, 323 or 333, the output level S1 and Sr under a condition that no noise exists are determined so as to indicate the angle $\theta$ relative to the driver 180.

Figure 18:
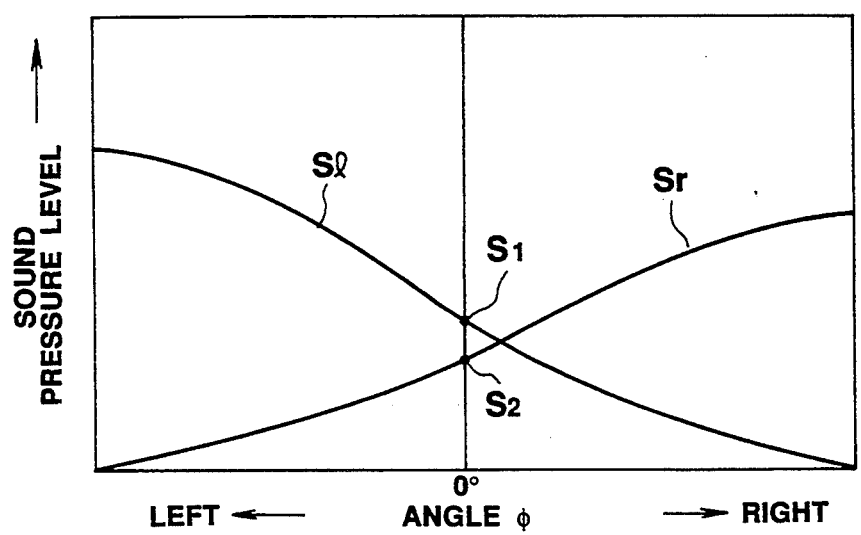
FIG. 18 is a graph which shows a change of the sound pressure level of right and left speakers corresponding to the angle of an object.

When the output levels for locating the sound image at a head-on side of the driver are S1 and S2, the output level S1 and Sr are represented as follows:

$$S1 = (1 + A1(\Phi)) \cdot S1$$

$$Sr = (1 + A2(\Phi)) \cdot S2$$

wherein $A1(\Phi)$ and $A2(\Phi)$ are functions each of which indicates the change of the sound pressure level according to the change of f. For example, when the driver is positioned at a right hand side, the output level S1 and Sr are shown by a graph of FIG. 18, in which the output level of the left side speaker is relatively larger.

The functions $A1(\Phi)$ and $A2(\Phi)$ are different from every vehicles having respective passenger spaces and the location of speakers. Accordingly, the result of such inspection is previously memorized in a memory in the form of a table, and the output level S1 and Sr are outputted according to the angle to which the sound image should be located.

In a step 600, the noise level NS in the passenger compartment is measured by the microphone 170. The smaller sound is impressed to be smaller than the real output level. Therefore, in a step 601, the correction amount of the output level of the speaker is calculated corresponding to the noise level NS. When the difference between the output levels from the speakers 130 and 131 before correction is $\Delta S$, the difference $\Delta Sh$ of the amended level is represented as follows:

$$\Delta Sh = B \cdot NS \cdot \Delta S \text{ (B is constant)}$$

The difference $\Delta Sh$ of the correction level is added to the smaller output level. That is to say, the output level of the speaker is corrected as follows:

If $S1 < Sr$,
then the output level of the left side speaker $S1h = S1 + \Delta Sh$.
If $S1 > Sr$,
then the output level of the right side speaker $Srh = Sr + \Delta Sh$.

In a step 304, according to the corrected output level the warning sound is outputted from the speakers 130 and 131.

With this arrangement, the warning sound is heard to be the same as that in which no noise exists.

With the thus arranged stereophonic warning system, since the output level from the speaker is corrected according to the noise level at the position of the driver, even when the vehicle generates loud noise such as noise from its engine and increases the noise level in the vehicle compartment, the driver can recognize the sound image of the object at a corrected direction by correcting the change of the recognition level of the driver due to the change of the noise level.

Although the position of the microphone 170 is not limited to the above-mentioned embodiment, it is preferable that the position is located near the driver as possible. Accordingly, it is preferable that the position is located at an inner roof above the driver's head, a center portion of a head rest or a shoulder portion of a seat.

While the correction of the output level from the microphone 170 in the described embodiment has been carried out such that the difference between both output levels of the respective speakers is kept constant by increasing the output level of the speaker of the smaller output level side, it will be understood that the correction of the output level may be carried out by decreasing the output level of the speaker of the larger output side or by increasing the output levels of both speakers in different levels.

With the thus arranged stereophonic warning apparatus, a judging means for judging a warning priority level of the detected object is arranged to change the warning sound according to the warning priority level. Accordingly, even when a plurality of objects, the driver can easily recognize the degree of the danger or emergency of the respective objects.

In the first embodiment, the radars are disposed at front, rear, right and left portions, respectively, to watch the area which surrounds the vehicle in broad extent, and when the object is detected at the rearward side of the driver, the sound image respective to the position of the object is located at the mirror through which the object is recognized. Accordingly, the driver can rapidly recognize the object without viewing backward of the vehicle.

Furthermore, the third embodiment according to the present invention is arranged to form a sound image to an estimated position upon taking account of the processing time of the position estimating means and the response time of the driver to the sound. Accordingly, even when the object moves at a high speed, the driver can recognize the object at a position to which the sound image is located. Additionally, the embodiment shown in FIG. 14 according to the present invention is arranged to correct the output level of each speaker according to the noise level for the driver. Accordingly, even when the noise level in the passenger compartment is increased, for example, by the increase of the sound of the vehicle engine, the driver can accurately hear the sound image of the position without interrupted by the noise.

What is claimed is:

1. A stereophonic warning apparatus for a vehicle, comprising:
   means for detecting objects around the vehicle and outputting signals indicative of a position of each of the detected objects;
   means for estimating a future position of said each of the detected objects at a future moment after a predetermined time period has passed from a detection moment at which said each of the detected objects was detected by said object detecting means, on the basis of the signals from said object detecting means, and for outputting signals indicative thereof;
   means for detecting a driving condition of the vehicle and outputting a signal indicative thereof;
   means for judging a warning priority level of said each of the detected objects according to the signals from said object detecting means and said vehicle driving condition detecting means;
   a plurality of speakers disposed in the vehicle; and
   means for controlling an output level of each of said speakers according to the signals from said position estimating means to generate a sound image including a warning sound positioned as if the warning sound originates from the future position of said each of the detected objects, said controlling means varying the warning sound according to the warning priority level in order to distinguish the respective priority levels of said each of the detected objects from each other even if a plurality of objects exist around the vehicle.

2. The stereophonic warning apparatus as claimed in claim 1, wherein said position estimating means comprises means for determining said predetermined time period on the basis of a time duration from said detection moment of said each of the detected objects to a response moment at which a driver of the vehicle responds to the sound image.

3. The stereophonic warning apparatus as claimed in claim 1, further comprising means for positioning the sound image warning sound for a detected object at at least one of a right door mirror, a left door mirror and a room mirror in which the detected object is shown when the position of the detected object is detected to be rearward of a driver of the vehicle.

4. The stereophonic warning apparatus as claimed in claim 1, wherein said judging means judges the warning priority level of said each of the detected objects according to a relative speed between said each of the detected objects and the vehicle, a distance between said each of the detected objects and the vehicle, and said driving condition of the vehicle.

5. The stereophonic warning apparatus as claimed in claim 1, wherein said vehicle driving condition detecting means detects at least one of: a position of a winker lever, an operational state of brakes of the vehicle, a steering angle of a steering system of the vehicle and an angular velocity of the steering system of the vehicle, said controlling means thereby varying the warning sound in accordance with said at least one of: the position of the winker lever, the operational state of the brakes of the vehicle, the steering angle of the steering system of the vehicle and the angular velocity of the steering system of the vehicle.

6. A stereophonic warning apparatus for a vehicle, comprising:
   means for detecting an object around the vehicle and outputting a signal indicative of a position of the detected object;
   means for detecting a vehicle driving condition;
   means for judging a warning priority level of the detected object according to the signals from said object detecting means and said vehicle driving condition detecting means;
   a plurality of speakers disposed in the vehicle;
   means for controlling an output level of each of said speakers according to the signal from said object detecting means to generate a sound image by means of a warning sound, said controlling means varying the warning sound according to the warning priority level; and
   means for measuring a noise level in a passenger compartment of the vehicle, wherein said controlling means corrects the output level of said speakers according to the noise level detected by said noise level measuring means.

7. The stereophonic warning apparatus as claimed in claim 6, further comprising means for positioning the sound image for the detected object at at least one of a right door mirror, a left door mirror and a room mirror in which the detected object is shown when the position of the detected object is detected to be rearward of a driver of the vehicle.

8. A stereophonic warning apparatus warning apparatus for a vehicle, comprising:
   means for detecting an object around the vehicle and outputting a signal indicative of a position of the detected object;
   means for detecting a driving condition of the vehicle and outputting a signal indicative thereof;
   means for judging a warning priority level of the detected object according to the signals from said object detecting means and said vehicle driving condition detecting means;
   a plurality of speakers disposed in the vehicle;
   means for controlling an output level of each of said speakers according to the signal from said object detecting means to generate a sound image including a warning sound positioned as if the warning sound originates from a position where the object is located, said controlling means varying the warning sound according to the warning priority level; and
   means for positioning the sound image warning sound for the detected object at at least one of a right door mirror, a left door mirror and a room mirror in which the detected object is shown when the position of the detected object is detected to be rearward of a driver of the vehicle.

9. A stereophonic warning apparatus warning apparatus for a vehicle, comprising:
  means for detecting an object around the vehicle and outputting a signal indicative of a position of the detected object;
  means for detecting a driving condition of the vehicle and outputting a signal indicative thereof;
  means for judging a warning priority level of the detected object according to the signals from said object detecting means and said vehicle driving condition detecting means;
  a plurality of speakers disposed in the vehicle; and
  means for controlling an output level of each of said speakers according to the signal from said object detecting means to generate a sound image including a warning sound positioned as if the warning sound originates from a position where the object is located, said controlling means varying the warning sound according to the warning priority level,
  wherein said judging means judges the warning priority level of the detected object according to a relative speed between the detected object and the vehicle, a distance between the detected object and the vehicle, and said driving condition of the vehicle.

10. A stereophonic warning apparatus for a vehicle, comprising:
  means for detecting an object around the vehicle and outputting a signal indicative of a position of the detected object;
  means for detecting a driving condition of the vehicle and outputting a signal indicative thereof;
  means for judging a warning priority level of the detected object according to the signals from said object detecting means and said vehicle driving condition detecting means;
  a plurality of speakers disposed in the vehicle; and
  means for controlling an output level of each of said speakers according to the signal from said object detecting means to generate a sound image including a warning sound positioned as if the warning sound originates from a position where the object is located, said controlling means varying the warning sound according to the warning priority level, wherein said controlling means comprises means for calculating a first azimuth angle of the object relative to orientation of a driver of the vehicle, and for generating said sound image to present said warning sound from a virtual source positioned relative to the driver at a source azimuth angle equal to said first azimuth angle of the object.

11. The stereophonic warning apparatus as claimed in claim 10, wherein said calculating and generating means comprises converting means for converting a second azimuth angle of the object relative to an orientation of the vehicle to said first azimuth angle relative to the driver, and for controlling said speakers to generate said sound image to have said source azimuth angle.

12. A stereophonic warning apparatus for a vehicle, comprising:
  means for detecting objects around the vehicle and outputting signals indicative of a position of each of the detected objects;
  means for estimating a future position of said each of the detected objects at a future moment after a predetermined time period has passed from a detection moment at which said each of the detected objects was detected by said object detecting means, on the basis of the signals from said object detecting means, and for outputting signals indicative thereof;
  means for detecting a driving condition of the vehicle and outputting a signal indicative thereof;
  means for judging a warning priority level of said each of the detected objects according to the signals from said object detecting means and said vehicle driving condition detecting means;
  a plurality of speakers disposed in the vehicle; and
  means for controlling an output level of each of said speakers according to the signals from said position estimating means to generate a sound image including a warning sound positioned as if the warning sound originates from the future position of said each of the detected objects, said controlling means varying the warning sound according to the warning priority level in order to distinguish the respective priority levels of said each of the detected objects from each other even if a plurality of objects exist around the vehicle, wherein said controlling means comprises means for calculating a first azimuth angle of said each of the detected objects relative to orientation of a driver of the vehicle, and for generating said sound image to present said warning sound from a virtual source positioned relative to the driver at a source azimuth angle equal to said first azimuth angle of said each of the detected objects.

13. The stereophonic warning apparatus as claimed in claim 12, wherein said calculating and generating means comprises converting means for converting a second azimuth angle of said each of the detected objects relative to an orientation of the vehicle to said first azimuth angle relative to the driver, and for controlling said speakers to generate said sound image to have said source azimuth angle.

14. A stereophonic warning apparatus for a vehicle, comprising:
  object detecting means for detecting a relative speed between an object and the vehicle and a distance between the object and the vehicle, said object detecting means outputting a signal indicative of the relative speed and the distance between the object and the vehicle;
  means for detecting a driving condition of the vehicle and outputting a signal indicative thereof;
  means for judging a warning priority level of the object according to the signals from said object detecting means and said vehicle driving condition detecting means;
  a plurality of speakers disposed in the vehicle; and
  means for controlling an output level of each of said speakers according to the signal from said object detecting means to generate a sound image including a warning sound having an apparent sound position as if the warning sound is generated at a position where the object is located, said controlling means varying the warning sound according to the warning priority level in order to distinguish among respective priority levels of different objects if a plurality of objects exist around the vehicle and are detected by said object detecting means.

15. The stereophonic warning apparatus as claimed in claim 14, wherein said vehicle driving condition detecting means detects at least one of: a position of a winker lever, an operational state of brakes of the vehicle, a steering angle of a steering system of the vehicle and an angular velocity of the steering system of the vehicle, said controlling means thereby varying the warning sound in accordance with said at least one of: the position of the winker lever, the operational state of the brakes of the vehicle, the steering angle of the steering system of the vehicle and the angular velocity of the steering system of the vehicle.

16. A stereophonic warning apparatus for a vehicle, comprising:
    object detecting means for detecting a relative speed between an object and the vehicle and a distance between the object and the vehicle, said detecting means outputting a signal indicative of the relative speed and the distance between the object and the vehicle;
    means for detecting a driving condition of the vehicle;
    means for judging a warning priority level of the object according to the signals from said object detecting means and said vehicle driving condition detecting means;
    a plurality of speakers disposed in the vehicle; and
    means for controlling an output level of each of said speakers according to the signal from said object detecting means to generate a sound image including a warning sound having an apparent sound position as if the warning sound is generated at a position where the object is located, said controlling means varying the warning sound according to the warning priority level in order to distinguish among respective priority levels of different objects if a plurality of objects exist around the vehicle,
    wherein said controlling means comprises means for calculating a first azimuth angle of the object relative to orientation of a driver of the vehicle, and for generating said sound image to present said warning sound from a virtual source positioned relative to the driver at a source azimuth angle equal to said first azimuth angle of the object.

17. The stereophonic warning apparatus as claimed in claim 16, wherein said calculating and generating means comprises converting means for converting a second azimuth angle of the object relative to an orientation of the vehicle to said first azimuth angle relative to the driver, and for controlling said speakers to generate said sound image to have said source azimuth angle.

18. A stereophonic warning apparatus warning apparatus for a vehicle, comprising:
    means for detecting an object around the vehicle and outputting a signal indicative of a position of the detected object;
    means for detecting a driving condition of the vehicle and outputting a signal indicative thereof;
    means for judging a warning priority level of the detected object according to the signals from said object detecting means and said vehicle driving condition detecting means;
    a plurality of speakers disposed in the vehicle; and
    means for controlling an output level of each of said speakers according to the signal from said object detecting means to generate a sound image including a warning sound positioned as if the warning sound originates from a position where the object is located, said controlling means varying the warning sound according to the warning priority level,
    wherein said controlling means forms a sound image at an estimated position of the detected object upon taking account of a processing time of said position estimating means and a response time of the driver to the sound.

19. A stereophonic warning apparatus warning apparatus for a vehicle, comprising:
    means for detecting an object around the vehicle and outputting a signal indicative of a position of the detected object;
    means for detecting a driving condition of the vehicle and outputting a signal indicative thereof;
    means for judging a warning priority level of the detected object according to the signals from said object detecting means and said vehicle driving condition detecting means;
    a plurality of speakers disposed in the vehicle; and
    means for controlling an output level of each of said speakers according to the signal from said object detecting means to generate a sound image including a warning sound positioned as if the warning sound originates from a position where the object is located, said controlling means varying the warning sound according to the warning priority level,
    wherein said vehicle driving condition detecting means detects at least one of: a position of a winker lever, an operational state of brakes of the vehicle, a steering angle of a steering system of the vehicle and an angular velocity of the steering system of the vehicle, said controlling means thereby varying the warning sound in accordance with said at least one of: the position of the winker lever, the operational state of the brakes of the vehicle, the steering angle of the steering system of the vehicle and the angular velocity of the steering system of the vehicle.

* * * * *